J. M. WORTH.
FRICTION TRANSMISSION MECHANISM.
APPLICATION FILED MAY 3, 1918.
1,404,676.
Patented Jan. 24, 1922.
2 SHEETS—SHEET 1.
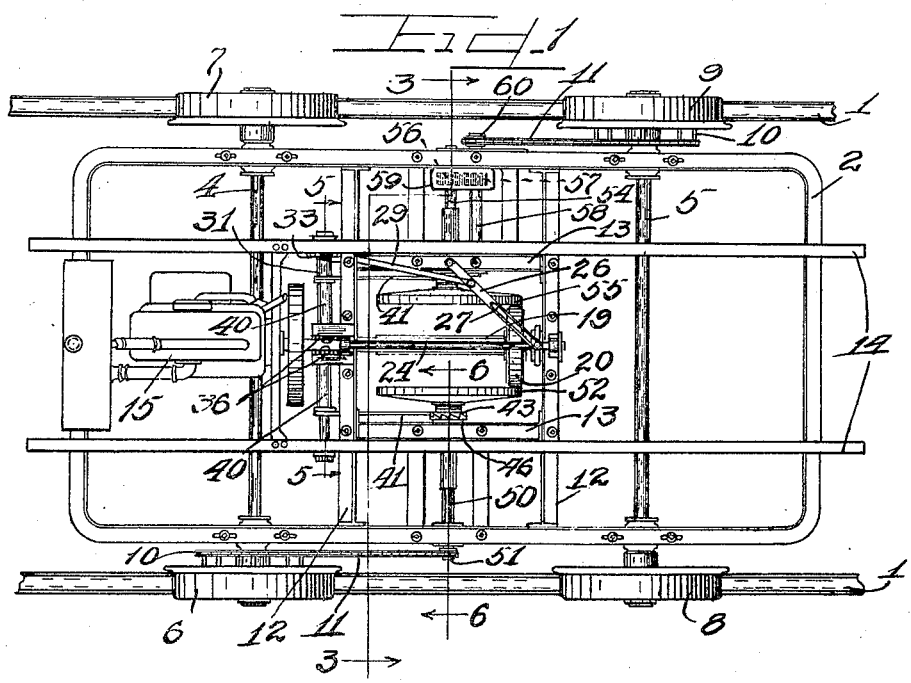
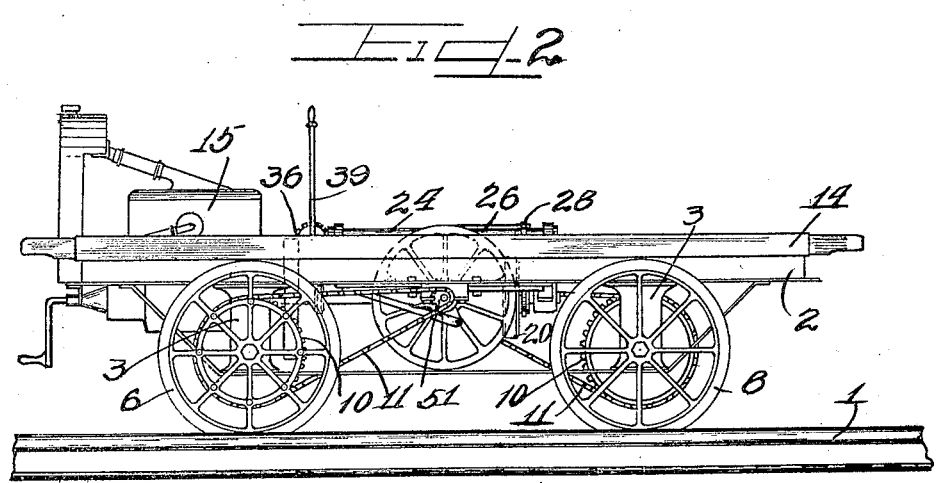

J. M. WORTH.
FRICTION TRANSMISSION MECHANISM.
APPLICATION FILED MAY 3, 1918.
1,404,676.
Patented Jan. 24, 1922.
2 SHEETS—SHEET 2.
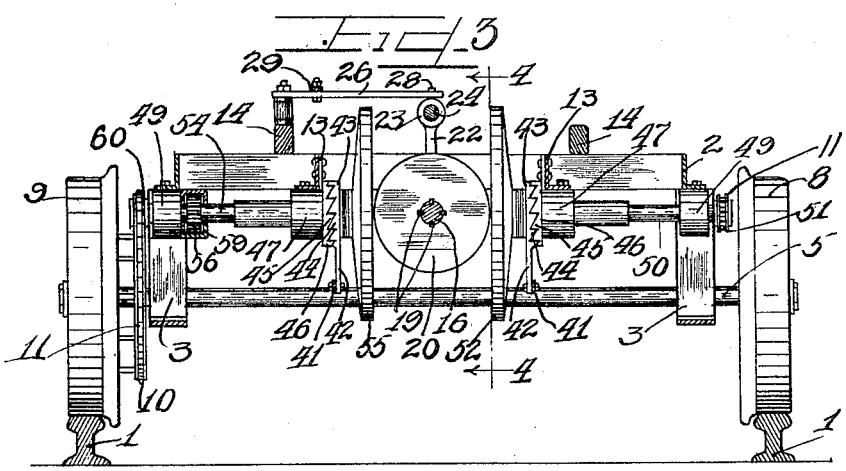
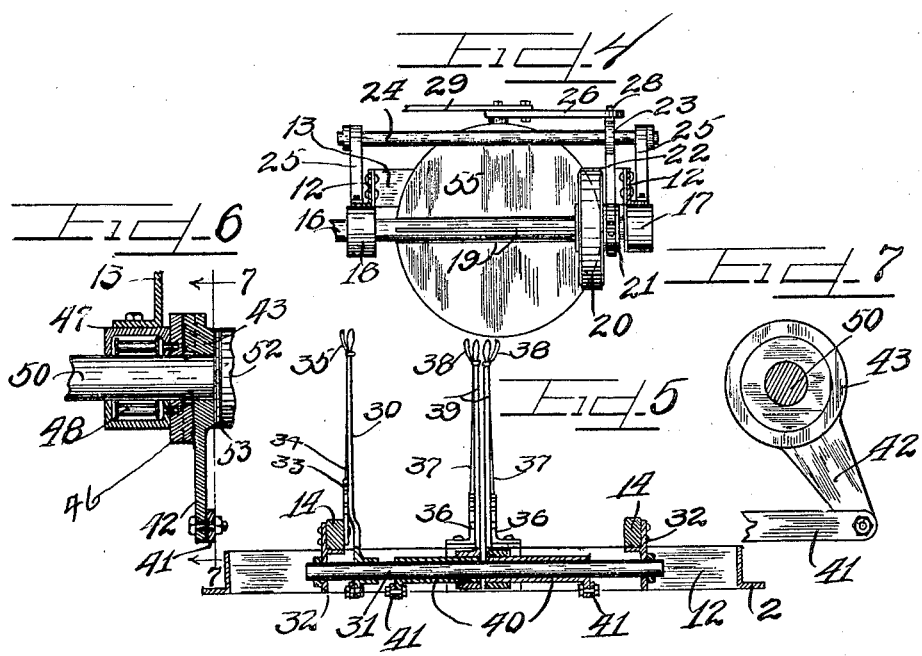

UNITED STATES PATENT OFFICE.

JAMES M. WORTH, OF CHICAGO, ILLINOIS.

FRICTION TRANSMISSION MECHANISM.

1,404,676. Specification of Letters Patent. Patented Jan. 24, 1922.

Application filed May 3, 1918. Serial No. 232,391.

*To all whom it may concern:*

Be it known that I, JAMES M. WORTH, a citizen of the United States, and a resident of the city of Chicago, in the county of Cook and State of Illinois, have invented certain new and useful Improvements in a Friction Transmission Mechanism; and I do hereby declare that the following is a full, clear, and exact description of the same, reference being had to the accompanying drawings, and to the numerals of reference marked thereon, which form a part of this specification.

This invention relates to a friction power transmision mechanism adapted for use on motor trucks and other power driven vehicles and embracing manually actuatable clutch controlled friction wheels adapted to be driven by means of a friction disk slidably secured on the driving shaft of the truck to receive a direct drive from the motor and transmit said drive to said friction wheels at different rates of speed by slidably moving the driving disk upon the driving shaft either toward or away from the axis of said friction wheels, into different positions on said driving shaft.

It is an object of this invention to construct a variable speed friction drive mechanism for vehicles.

It is also an object of the invention to provide a manually controlled variable speed friction drive mechanism for a vehicle adapted to transmit a drive from the motor of the vehicle to the vehicle wheels at a speed greater or less than that of the motor driving shaft.

Another object of this invention is the construction of a clutch controlled friction driving mechanism for a motor truck adapted to transmit a drive from the motor of the truck to the wheels thereof at a speed greater or less than that of the motor driving shaft.

A further object of this invention is the construction of a variable speed friction drive mechanism having clutch controlled friction wheels for transmitting a variable drive to the wheels of a vehicle by moving a friction drive disk radially with respect to said friction wheels.

It is furthermore an object of this invention to provide friction driving mechanism for a truck adapted to receive a drive from a motor and transmit the same to the wheels of the truck at a rate of speed greater or less than that of the motor.

It is an important object of this invention to provide a variable speed friction driving mechanism of simple and effective construction and adapted to be manually actuated to permit different speeds to be transmitted to the wheels of a vehicle from a prime driver.

Other and further important objects of this invention will be apparent from the disclosures in the specification and drawings.

The invention (in a preferred form) is illustrated in the drawings and hereinafter more fully described.

On the drawings:

Figure 1 is a top plan view of a friction driven truck embodying the principles of this invention.

Figure 2 is a side elevation thereof.

Figure 3 is a transverse section taken on line 3—3 of Figure 1.

Figure 4 is a detail view taken on line 4—4 of Figure 3, with parts omitted.

Figure 5 is an enlarged detail section on line 5—5 of Figure 1.

Figure 6 is an enlarged fragmentary detail section taken on line 6—6 of Figure 1, with parts omitted and with parts broken away.

Figure 7 is a view taken on line 7—7 of Figure 6.

As shown on the drawings:

The reference numeral 1, indicates rails or tracks upon which are mounted a truck or vehicle embodying the principles of this invention and embracing a chassis or frame 2, having depending bracket arms or supports 3, rigidly secured on the side sills thereof for supporting a front axle 4, and a rear axle 5. Mounted upon the ends of the front and rear axles 4 and 5, to the outside of the chassis frame are flanged front wheels 6 and 7, and flanged rear wheels 8 and 9, respectively. The front and rear wheels rest upon the tracks 1, with the flanges thereof disposed to the inside of the tracks to hold the truck in position on said tracks. Rigidly secured to the inner side of the front wheel 6, and the rear wheel 9, is a large gear or sprocket wheel 10, around each of which a driving chain 11, is trained.

Rigidly secured to the side sills of the chassis, intermediate the front and rear axles are a pair of parallel transversely disposed angle irons or cross beams 12, spaced from one another, and secured together by means of longitudinally disposed angle irons or brace beams 13, which, together with said angle irons 12, form an auxiliary frame. Secured rigidly to the chassis and the auxiliary frame are two longitudinally disposed handle bars 14, spaced from one another and having handle ends extending beyond the front and rear sills of the chassis to afford a means whereby the truck may be lifted to or from the tracks.

Mounted upon the front end of the chassis is a motor, engine or power plant 15, which is adapted to rotate a centrally and longitudinally disposed driving or transmission shaft 16, having the front end connected with the motor, and the rear end journalled in a bearing 17, secured to the rear angle iron 12. Said transmission shaft 16, is also journalled intermediate the ends thereof in a bearing 18, secured to the front angle iron 12. As clearly shown in Figure 4, the rear portion of the transmission shaft intermediate the bearings 17 and 18, is provided with a plurality of longitudinal guide ribs or keys 19, which are rigidly secured in suitable longitudinal passages or grooves provided for the purpose in the transmission shaft. A centrally apertured master or friction driving wheel or disk 20, provided with longitudinal slots or grooves in the inner peripheral surface thereof, is slidably mounted on the rear end of the transmission shaft intermediate the bearings 17 and 18, with the grooves thereof engaging the ribs 19, whereby said disk is adapted to be rotated with the transmission shaft. The disk 20, has a sleeve or hub extension 21, integrally formed or rigidly secured centrally on the rear surface thereof, and securely clamped around said hub 21, is the lower end of an upwardly directed arm 22, provided with an integral guide ring 23, at the upper end thereof slidably engaged on a guide bar or rod 24, disposed longitudinally of the chassis above the rear portion of the transmission shaft, and having the ends thereof supported on upright brackets 25, one of which is centrally mounted upon each of the angle irons 12, of the auxiliary frame.

Pivotally mounted on one of the angle irons 13, is one end of an arm or link 26, having a longitudinal slot 27, in the other end through which a retaining bolt 28, engages, to hold the link 26, slidably associated with the guide ring 23, in which the bolt 28, is engaged. Pivoted to the link 26, is one end of an arm or link 29, the other end of which is pivotally connected to the lower end of a lever 30, rotatably mounted on a transverse axle 31, near one end thereof adjacent one of the handle bars 14, as clearly shown in Figure 5. The axle 31, has the ends thereof supported in depending brackets 32, secured upon the handle bars 14, to the front of the front angle iron 12. Rigidly secured to the inner side of one of the handle bars 14, is a gear or sprocket segment 33, which projects above the handle bar and is adapted to have the lower end of a manually operated locking rod 34, engage therewith. Said locking rod is secured to the lever 30, and is provided with a pivoted handle 35, to afford a means for actuating the locking rod into or out of engagement with said sprocket segment 33.

Rigidly mounted on the front angle iron 12, and projecting forwardly therefrom are a pair of parallel gear or sprocket segments 36, each of which is removably engaged by the lower end of a locking rod 37, actuatable by a pivoted handle 38, and secured to a speed shift or speed change lever 39. The speed levers 39, each have the lower end thereof rigidly secured to the inner end of a sleeve 40, rotatably mounted on the axle 31. Said sleeves are axially aligned with one another and have a depending integral lug or projection formed on the outer end thereof, to each of which is pivotally connected the forward end of a longitudinally disposed connecting bar or rod 41, the rear end of which is pivotally connected to a crank 42, integrally formed on a passaged shift clutch member 43, having teeth 44, integrally formed around the margin of the outer face thereof. The clutch teeth 44, of the shifting clutch members, are positioned to mesh with teeth 45, of stationary clutch members 46, which are secured to bearing boxes 47, rigidly attached to the angle bars 13. Disposed in each of the boxes 47, are roller bearings 48. Secured to the side sills of the chassis 2, and axially aligned with the bearing boxes 47, are bearing boxes 49, also having roller bearings 48, disposed therein. Journalled in the bearing boxes 47 and 49, which are mounted on the side of the truck on which the wheel 6, is mounted, is a shaft 50, on the outer end of which is mounted a sprocket pinion 51, over which is trained the front driving chain 11. Secured on the inner end of the shaft 50, is a friction wheel or disk 52, disposed at right angles to the friction driving disk 20. A roller or ball bearing 53, is positioned between the clutch member 43, and the friction disk 52, as clearly shown in Figure 6. Journalled in the bearing boxes 47, and 49, disposed on the side of the chassis on which the wheel 9, is mounted, is a shaft 54, having a friction wheel or disk 55, secured on the inner end thereof at right angles to the friction driving disk 20. Keyed on the shaft 54, to the inside of the chassis sill is a gear 56, which meshes with a gear 57, keyed upon an auxiliary shaft 58, journalled in suitable bearings mounted on the chassis. The meshing gears 56 and 57, are enclosed by means of a gear box 59. Secured on the outer end of the auxiliary shaft 58, and to the outside of the chassis sill is a sprocket pinion 60, around which the rear driving chain 11, is trained.

The operation is as follows:

When it is desired to operate the truck, the engine is started in the customary manner, thereby rotating the transmission shaft 16, and the friction drive disk 20, which is slidably mounted thereon. In normal position the clutch members 43 and 46, of each clutch, are positioned with the teeth 44 and 45, thereof, closely interfitting one another, in which position the friction disks 52 and 55, are held out of contact with the driving disk 20, as shown in Figure 3. To rotate the disks 52 and 55, the handles 38, are moved toward the handles of the levers 39, thereby raising the locking rods 37, out of engagement with the gear segments 36. The levers 39, are then pulled rearwardly, thereby exerting a forward pull on the connecting rods 41, and causing rotation of the clutch members 43, the teeth 44, of which, slide outwardly on the teeth 45, of the stationary clutch members 46, thereby slidably moving the friction disks 52 and 55, inwardly toward one another into engagement with the rotating friction drive disk 20, which causes rotation of the disks 52 and 55, and the shafts 50 and 54, respectively. The pinion 51, rotates with the shaft 50, and operates the chain 11, trained thereon and around the sprocket wheel 10, on the front wheel 6, thus imparting a drive to the front axle 4, and the wheels 6 and 7. The shafts 50 and 54, both being driven by the disk 20, rotate in opposite directions. The shaft 54, is rotated by the disk 55, and causes rotation of the gear 56, which, being in mesh with the gear 57, rotates the same, and thereby the pinion 60, which in turn causes rotation of the chain 11, and the sprocket wheel 10, on the rear wheel 9, rotating the rear axle 5, and the rear wheels 8 and 9, forwardly. The forwardly rotating movement of the front and rear wheels of the truck, of course, cause forward movement of the truck upon the tracks 1. To reverse the drive of the truck, it is merely necessary to throw the levers 39, forwardly instead of rearwardly, the handles 38, of course, being depressed first to release the levers from locked position.

The driving disk 20, is smaller than the driven disks 52 and 55, and the truck may have the rate of speed thereof increased by slidably moving the disk 20, radially inward with respect to the disks 52 and 55, by depressing the lever handle 35, thus releasing the lever 30, which is thrown rearwardly, causing a forward pull on the link 29, which in turn pulls the free slotted end of the link 26, forwardly. The bolt 28, projects through the slot 27, of the link 26. The link 26, pivotally swings forwardly, thereby slidably moving the drive disk forwardly on the guide ribs 19, of the transmission shaft 16, thus effecting a change of speed, the rate of which depends upon the relative position of the drive disk 20, with respect to its contact position with the friction faces of the driven disks 52 and 55. The speed of the truck increases as the disk 20, is moved inwardly from the outer periphery toward the axis of the driven disks. If the device is used for a tractor drive the throwing of one of the levers forward and the other back to neutral will cause a drive on one side only, turning the machine around.

I am aware that various details of this invention may be varied through a wide range without departing from the principles of this invention, and I therefore do not purpose limiting the patent granted otherwise than necessitated by the prior art.

I claim as my invention:

In a device of the class described the combination with a motor vehicle and the transmission shaft thereof, of a driving disk slidably mounted thereon, bearing members for said shaft, brackets mounted above said bearing members, a guide rod supported by said brackets, an arm engaging said driving disk, a guide ring on said arm slidably engaged on the guide rod, driven members connected with the wheels of the vehicle adapted to be driven by said driving disk, slotted means pivotally supported at one end and slidably connected with said guide ring, for sliding the guide ring on said rod to cause the driving disk to change the speed of the drive imparted to the driven members, and lever operated means pivotally connected to said slotted means between the slot and the pivoted end thereof for actuating the slotted means to effect a speed change.

In testimony whereof I have hereunto subscribed my name in the presence of two subscribing witnesses.

JAMES M. WORTH.

Witnesses:
Charles W. Hills, Jr.,
Fred E. Paesler.